INVENTORS
THEODORE CHRISTIE
PETER JUODIKIS

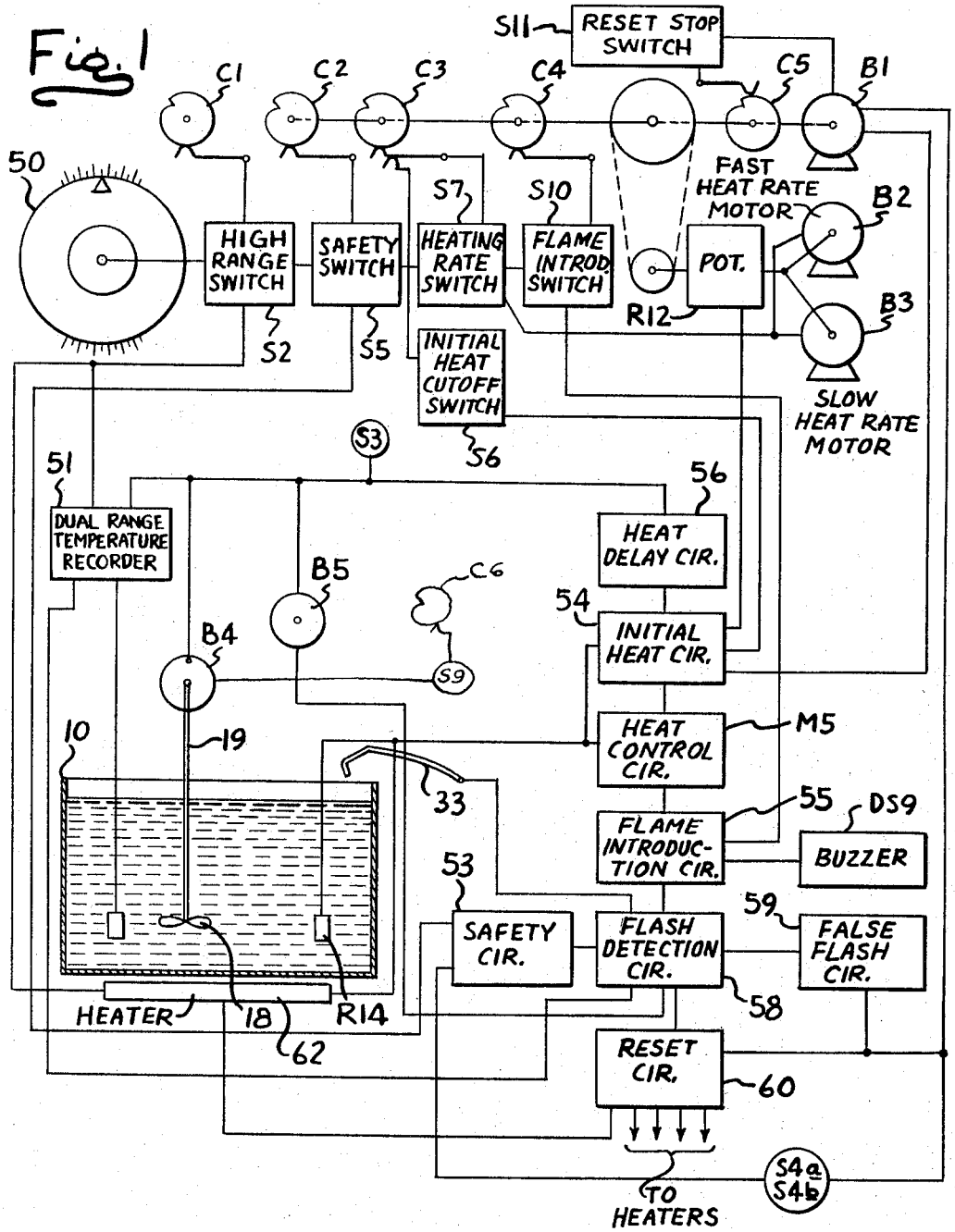

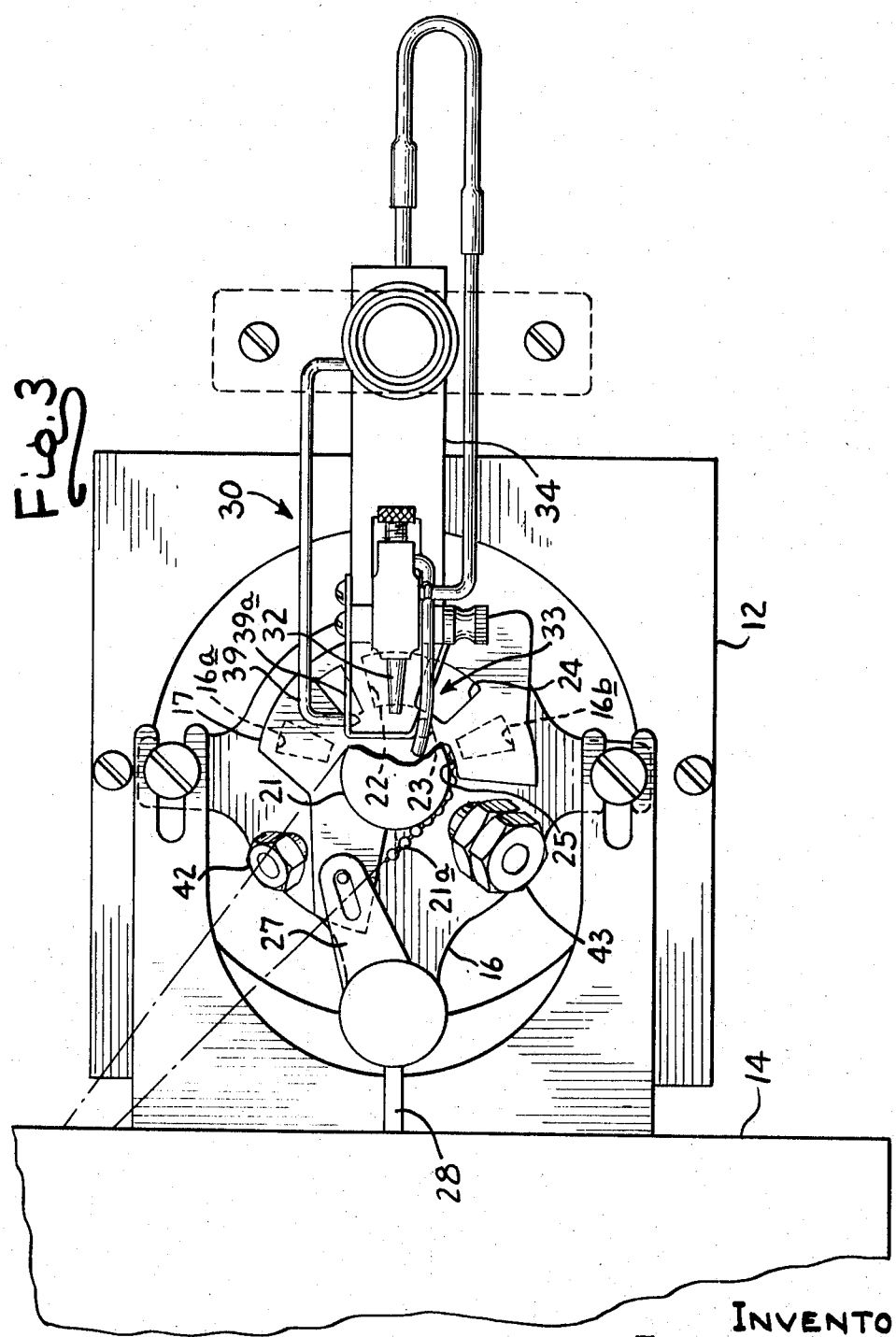

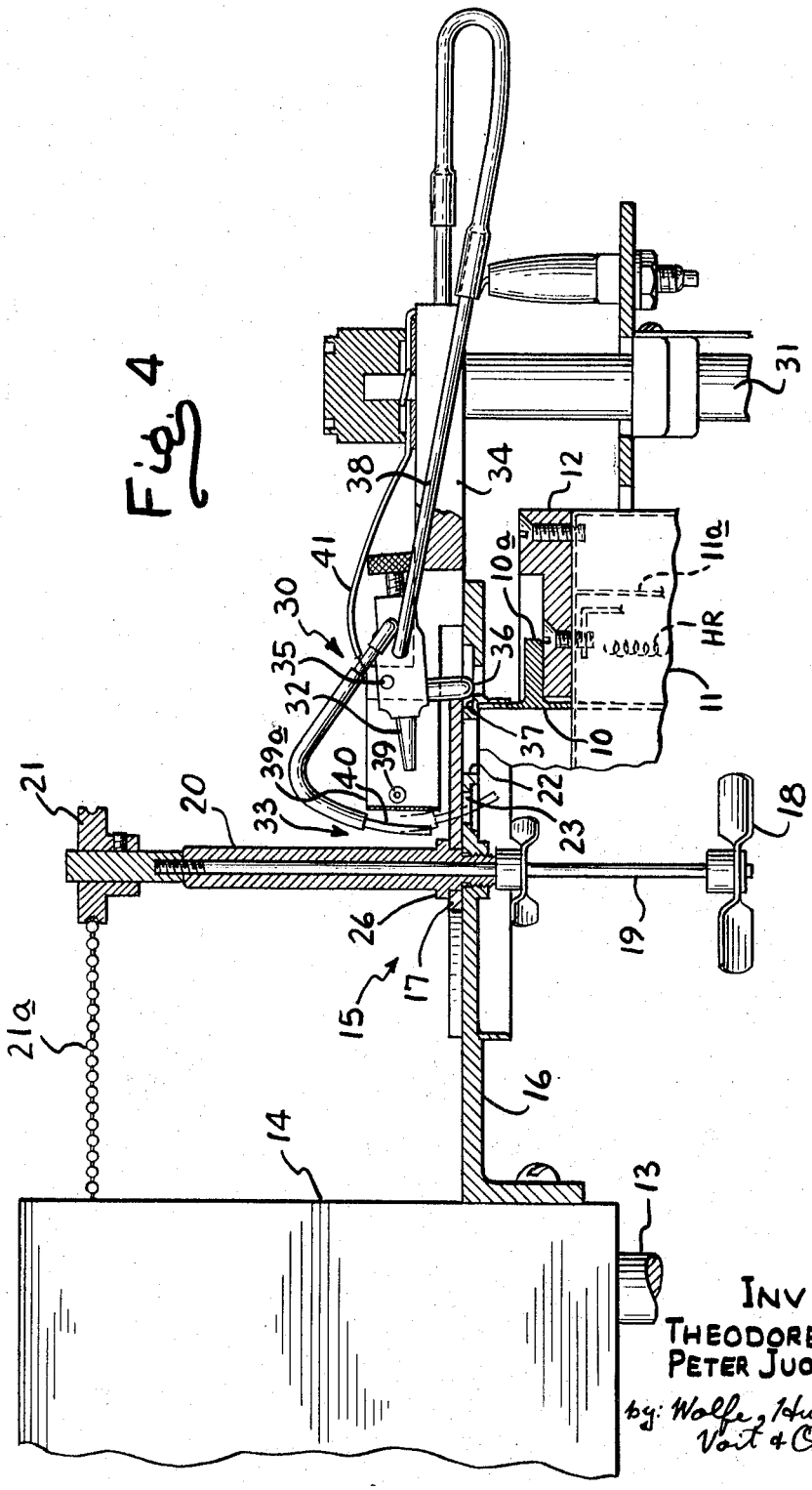

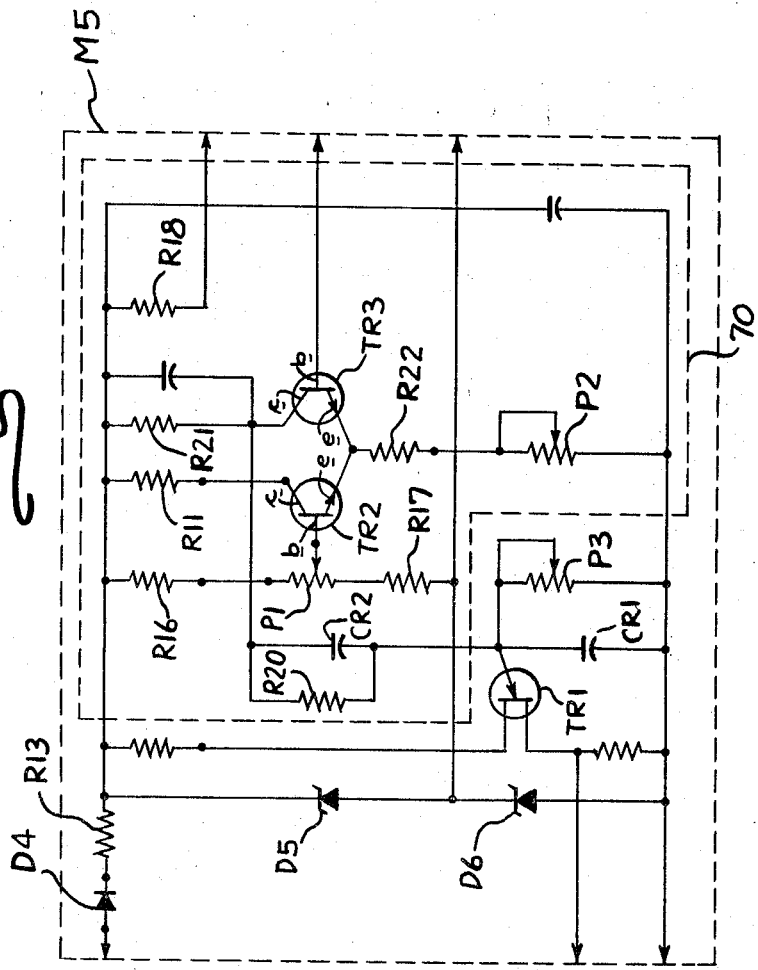

United States Patent Office 3,368,388
Patented Feb. 13, 1968

3,368,388
AUTOMATIC FLASH POINT TESTING DEVICE
Theodore Christie and Peter Juodikis, Chicago, Ill., assignors to Precision Scientific Company, Chicago, Ill., a corporation of Delaware
Filed Mar. 22, 1965, Ser. No. 441,540
10 Claims. (Cl. 73—36)

ABSTRACT OF THE DISCLOSURE

An automatic flash point testing instrument for carrying out the Pensky-Martens flash point test. The instrument includes a sample cup for holding the sample to be tested in a substantially closed container having a vapor region above the sample and temperature sensing means for sensing the temperature of the sample in the container, manually operated control means for setting an expected flash point for the sample, a heater for increasing the temperature of the sample, stirring means for stirring the sample in the container at the prescribed rate, a test flame assembly for periodically introducing a test flame into the vapor region for igniting the vapors therein, and a flash detection system for detecting a flash due to ignition of the vapors upon introduction of the test flame into the vapor region. A temperature control system provides two heating rates, a fast rate being automatically selected for flash point settings in a high range, and a slow rate being automatically selected for flash point settings in a low range. When the fast heating rate is selected, it is automatically changed to the slow rate at a predetermined point below the expected flash point setting. An initial heating control means is also included for rapidly advancing the heater to the initial sample temperature, and continuously heating the sample for a predetermined initial heating period while cyclically advancing the temperature control system in response to increases in the sample temperature so as to bring the sample into a controlled rate of thermal advance. An automatic reset is included for resetting the instrument in response to a detected flash, and a false flash system is provided for disabling the automatic resetting means if a flash occurs on the first flame introduction. The instrument also includes a safety feature which automatically terminates the test in response to an increase in the sample temperature to a predetermined point above the expected flashpoint set at the beginning of the test.

---

The present invention relates generally to automatic flash point testing devices and, more particularly, to an automatic device for carrying out the Pensky-Martens flash point test. The Pensky-Martens test is a method of determining the flash point of various flammable fluids, especially of certain petroleum products such as fuel oil and the like. Briefly stated, the Pensky-Martens test comprises heating the sample in a closed cup at a constant rate with continual stirring, and directing a small flame into the sample cup at regular intervals with simultaneous interruption of stirring. The flash point is the lowest temperature at which application of the test flame causes the vapor above the sample to ignite. According to the procedure specified in ASTM test D93-58T, the temperature of the sample should be increased at a rate of 9 to 11° F. per minute with the stirrer turning at 90 to 120 r.p.m., stirring in a downward direction.

Heretofore, a number of problems have been encountered in carrying out the Pensky-Martens test in automatic instruments, and especially in the temperature programming of the test samples in such instruments. For example, the sample is usually contained in a metal cup which is surrounded by high mass heaters, shields, and other instrument parts which vary widely in their masses and heat capacities. Also, the sample may be at a temperature quite different from the ambient temperature of its surroundings. Thus, if the sample has a relatively low flash point, both the sample and the cup must be pre-cooled to at least 45° F. below the expected flash point in order to retain the light volatiles of the sample. At the other extreme, the sample may have a very high flash point so that it is desirable to preheat the sample to facilitate handling and reduce total testing time. Another practical problem is the testing time that is lost while the heating rate program mechanism is advanced from its low temperature starting position to the initial sample temperature, since no heating is accomplished during this time.

Since a bridge circuit is normally utilized to control the heating of the sample in such automatic instruments, the net result of the problem described above is that the thermal lag of the entire system, and the eventual sudden demand for a temperature program, causes a delay in sensing which throws the bridge too far out of balance. Consequently, a situation eventually arises where a large influx of heat rapidly advances the sample temperature which, in turn, causes the sensing resistance of the bridge to exceed the control resistance, and a temperature-time profile assumes a wild oscillating pattern of under-shoots and over-shoots from the desired programmed heating rate.

It is a primary object of the present invention to provide an improved automatic flash point tester which is capable of automatically carrying out the prescribed Pensky-Martens test without substantially deviating from the programmed heating rates. A related object is to provide such a device which eliminates undesirable fluctuations from the design temperature-time profile due to thermal lags in the overall test system.

It is another object of the invention to provide an imprived automatic flash point tester of the above character which permits the use of any initial sample temperature without any substantial loss of time. More particularly, it is an object of the invention to provide a device which advances the heating rate program rapidly to the initial sample temperature and, at the same time, brings the entire system into thermal equilibrium before initiating any temperature programming.

It is a further object of the present invention to provide an improved automatic flash point tester of the type described which further reduces the overall testing time by increasing the temperature rapidly to a predetermined point below the expected flash point of the sample, and then continuing the heating to the flash point at a prescribed slower rate according to ASTM standards.

Still another object of the invention is to provide an improved automatic flash point tester of the foregoing type which permits the use of a variety of different flash point sensing and recording devices.

A still further object of the invention is to provide an improved automatic flash point tester of the character described which is highly reliable and requires a minimum of maintenance over extended operating periods. Another object is to provide such a device which is economical to manufacture and maintain.

Other objects and advantages of the invention will become apparent upon reading the following detailed description and upon reference to the drawings, in which:

FIGURE 1 is a diagrammatic illustration of an automatic flash point testing instrument embodying the present invention.

FIGS. 2a and 2b comprise a schematic circuit diagram of one particular circuit embodying the present invention and corresponding to the general system illustrated in FIG. 1 with the broken lines representing mechanical connections;

FIG. 3 is a plan view of the sample cup cover assembly and the test flame assembly employed in the instrument of FIGS. 1 and 2;

FIG. 4 is an elevation view partly in section of the apparatus shown in FIG. 3; and FIG. 5 is a schematic circuit diagram of the proportional heat control circuit embodied in the circuit of FIGS. 2a and 2b.

Figure 2A:
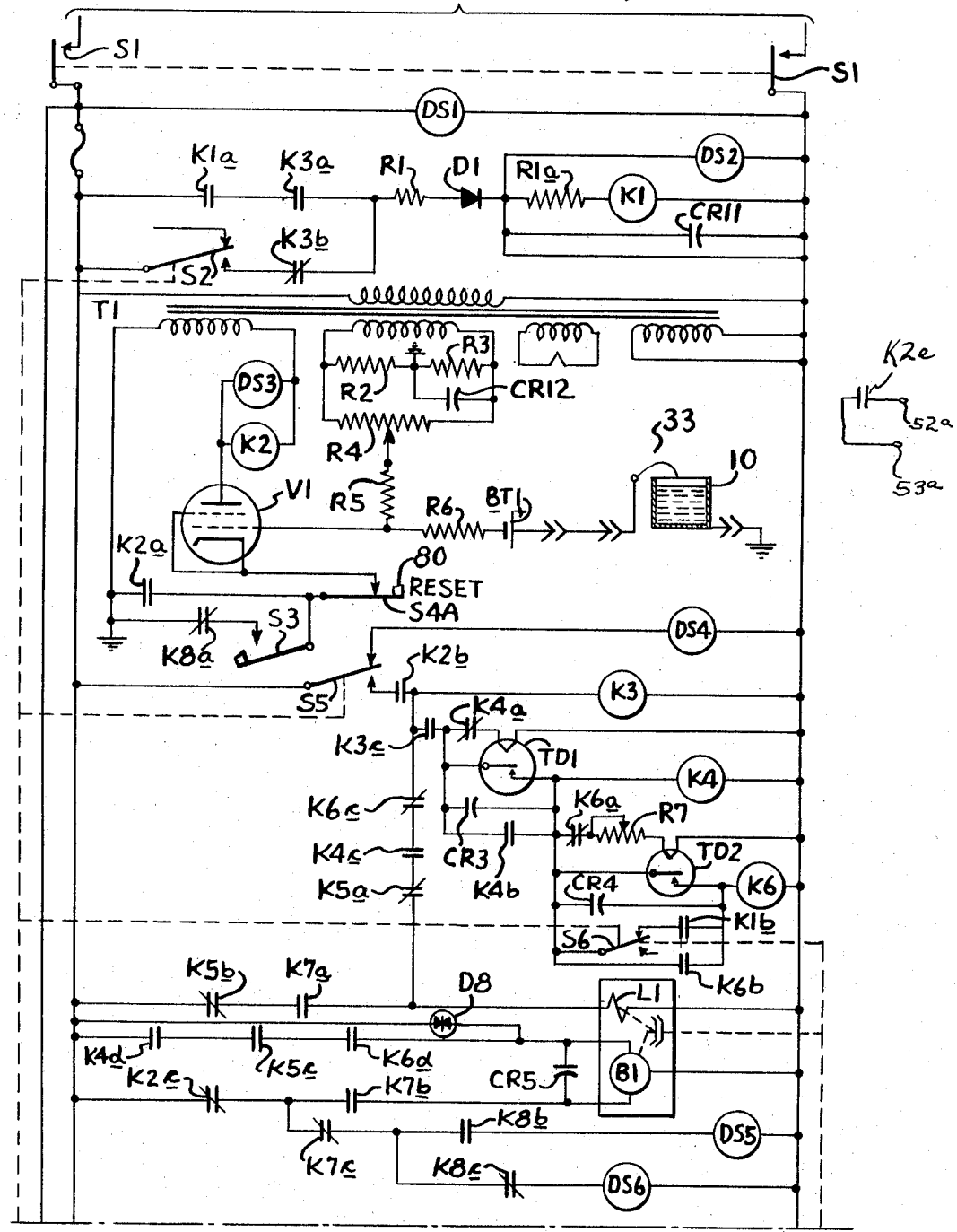

While the invention will be described in connection with certain preferred embodiments, it will be understood that it is not intended to limit the invention to these particular embodiments. On the contrary, it is intended to cover all alternatives, modifications and equivalents as may be included within the spirit and scope of the invention as defined by the appended claims.

Turning now to the drawings, the fluid sample to be tested is placed in a standard ASTM sample cup 10 which is lowered into a special heater well 11 mounted on the top of the main housing of the instrument. The heater well is covered with an insulating asbestos plate 12 which is cut out in the center to receive the sample cup 10 so that a peripheral flange 10a on the cup rests on the upper surface of the asbestos plate. The lower portion of the cup is surrounded by a radial, low mass, open coil heater element with a reflective shield to direct radiant energy to the cup.

Mounted off to one side of the heater well on a lifting shaft 13 is a small vertically movable housing 14 which carries a sample cup cover assembly 15 including an apertured cover plate 16, a shutter plate 17, and a stirring propeller 18. In order to facilitate insertion and removal of the sample cup 10, and also to prevent condensed fluid from the cover plate from dripping onto the heater elements when the cup is removed, the housing 14 is pivotally mounted on the shaft 13 so that it can be swung out away from the heater well 11. This also facilitates cleaning of both the heater well and the cover assembly. After the sample cup 10 is inserted into the well 11, the housing 14 is swung back into alignment with the well and then lowered until the cover plate 16 engages the top edge of the cup 10.

As the cover assembly 15 is lowered onto the sample cup 10, the stirring propeller 18 is immersed in the fluid sample. The propeller 18 is affixed to the lower end of a vertical drive shaft 18 which extends upwardly into threading engagement with a bushing sleeve 20 rotatably mounted in a center aperture in the cover plate 16. For the purpose of driving the stirring propeller 18 at the ASTM-prescribed rate of 90 to 120 r.p.m., the upper end of the sleeve 20 is connected via a pulley 21 and a bead drive chain 21a to a stirring drive motor B4 (FIGS. 1 and 2) within the housing 14.

In order to permit the introduction of a test flame and a flash detector probe into the head space of the sample cup 10, the cover plate is provided with a pair of apertures 22 and 23. These apertures are normally covered by the shutter plate 17 which is provided with a pair of corresponding openings 24 and 25 normally offset from the cover plate apertures 22 and 23. The shutter plate 17 is mounted for sliding movement relative to the cover plate 16 so that the openings 24, 25 can be brought into register with the apertures 22, 23 and thereby open the same for introduction of the test flame and flash detector probe. Thus, the shutter plate 17 is journalled on the sleeve 20, beneath a retaining flange 26, and is operably connected via mechanical linkage 27 to a cam-controlled actuating rod 28. The cam control for this actuating rod 28 will be described in detail hereinafter. As the actuating rod 28 is swung in a counterclockwise direction as viewed in FIG. 3, it rotates the shutter plate 17 through a predetermined arc around the sleeve 20 so as to bring the respective apertures in the cover plate and shutter plate into register with each other. The shutter plate is maintained in the open position for a predetermined dwell period, and then the actuating rod 28 is swung back in the clockwise direction to return the shutter plate to its original position and thereby close the cover plate apertures again.

As the shutter plate 17 is advanced to open the cover plate apertures, it automatically actuates a test flame assembly 30 which is mounted on the instrument housing on the opposite side of the heater well 11 from the housing 14. To permit the test flame assembly 30 to be removed from any hazardous vapors before the cover assembly 15 is removed from the sample cup 10 at the end of test, the assembly 30 is mounted for pivotal movement about its supporting shaft 31 so that the flame assembly can be swung out away from the cup 10.

The main elements of the flame assembly 30 are a test flame nozzle 32 and a flash detector probe 33, both of which are pivotally mounted on a horizontal yoke 34 by means of a pin 35. The nozzle 32 and probe 33 are positioned such that downward pivotal movement thereof causes the two elements to pass through the corresponding apertures 22 and 23, respectively, in the cover plate 14. In order to synchronize this pivotal movement with the opening of the apertures 22, 23, by the shutter plate 17, the pivotal movement is actuated by a camming arrangement between the nozzle 32 and the shutter plate 17. Thus, the nozzle 32 is provided with a depending cam 35 which engages a cam surface 37 formed on the outer periphery of the shutter plate 17. When the shutter is in its closed position covering the openings in the cover plate, the nozzle 32 and probe 33 are in their raised positions as illustrated in FIG. 3. Then as the shutter is rotated to open the cover plate apertures, the cam surface 37 forces the cam 36 back toward the shaft 31, thereby pivoting the nozzle 32 and probe 33 downwardly through the opened cover plate into the head space within the sample cup.

The test flame nozzle 32 is supplied with gas through a tube 38 and ignited by a pilot light 39, both of which are connected to a main gas supply line not shown. The gas flow rates to the flame nozzle 32 and pilot light 39 are adjusted by means of two independent valves not shown. The test flame should be adjusted to give the proper ASTM flame size, i.e., $5/32$ inch (4 mm.) in diameter, while the pilot light should simply be large enough to ignite the test flame. The flames are shielded by a plate 39a mounted on the side of the supporting yoke 34. The flash detector probe 33, which is simply an insulated wire having an exposed end portion 40 which enters the sample cup, is electrically charged by the positive terminal of a suitable battery via a conductor 41. The metal cup cover 16 is maintained at ground potential so that the air gap between the detector probe 33 and the cover 16 creates an impedance which forms a part of a flash detection circuit described in more detail below. When a flash occurs within the cup head space upon introduction of the test flame, the resulting ionization of the sample vapors in the air gap cause the air gap impedance to change momentarily, and a negative pulse from the battery is applied to the detection circuit.

In order to provide air for the test flame within the vapor region of the sample cup, a pair of air holes 16a and 16b are provided in the cover plate 16. As the shutter plate 17 is rotated relative to the cover plate 16, the hole 16a is uncovered by a corresponding aperture 17a in the shutter plate, while the hole 16b is uncovered by the edge 17b of the shutter, thereby admitting air to the sample cup head space.

For the purpose of sensing the temperature of the fluid sampled during the test, a pair of threaded apertures 42 and 43 are formed in the cover plate 16. These apertures are adapted to receive conventional temperature sensing elements, such as platinum resistance bulbs for example. One sensing element is used as a part of the heating control circuit to be described, while the other element may be connected to an automatic temperature recorder as described in more detail below. Regardless of what type of temperature sensing elements are used, the distance between the tip of the sensing element and the lower surface of the cup over plate 16 should be 1.75 inches according to ASTM standards.

In accordance with the present invention, there is provided an automatic flash point testing instrument including a manually operated control means for setting an expected flash point for the sample, a manually operated test initiation means and automatic control means responsive to the test initiation means for actuating the stirrer, and a temperature control system comprising the combination of time delay means operatively associated with said heater and said test initiation means for delaying the initiation of the heating of the sample for a predetermined period after the actuation of the stirring means so as to bring the sample and the instrument into thermal equilibrium, initial heating control means responsive to the time delay means and the sample temperature sensing means for rapidly advancing the temperature control system to the initial sample temperature, the initial heating control means including means for continuously heating the sample for a predetermined initial heating period while cyclically advancing the temperature control system in response to increases in the sample temperature so as to bring the sample into a controlled rate of thermal advance, and heating rate control means responsive to the expected flash point setting and to the termination of the initial heating period for heating samples having expected flash points in a predetermined high range at a prescribed fast heating rate up to a predetermined point below the expected flash points, and then automatically switching to a prescribed slow heating rate for the balance of the test, the heating rate control means being adapted to bypass the fast heating rate stage for samples having expected flash points in a predetermined low range. Thus, referring to FIG. 1, the illustrated instrument includes a dial 50 which is initially set by the operator to the expected flash point of the particular sample being tested. As the dial 50 is turned, it controls a battery of switches S2, S5, S7, S6 and S10 which are all fixed to the shaft of the dial. By rotating the battery of switches around a set of corresponding cams C1, C2, C3 and C4, the dial 50 automatically programs the various modes of operation of the instrument according to the expected flash point setting. Thus, when any expected flash point setting is made on the dial 50, the following selections are automatically made:

(1) A slow or fast heating rate is selected according to whether the expected flash point setting is in the high or low range, respectively.

(2) For expected flash point settings on the high range, a temperature of 150° F. below the particular flash point set on the dial is selected as the point at which the programmed heating rate is to change from the fast rate to the relatively slow rate of 9–11° F. per minute prescribed for the ASTM Pensky-Martens test.

(3) For expected flash point settings in the high range, a temperature of approximately 150° F. below the flash point set on the dial is selected as the point at which the initial heating is to be terminated.

(4) A temperature of approximately 20° F. below the flash point set on the dial is selected as the point at which the flame introduction circuit is to be actuated.

(5) A temperature of about 55° F. above the expected flash point setting is selected as the point at which the safety circuit is to be actuated.

(6) A high or low heater wattage is selected according to whether the expected flash point setting is in the low range or in the high range, respectively.

(7) In cases where a dual range temperature recording device is employed, the high or low range of the recorder is selected according to whether the expected flash point setting is in the high range or the low range, respectively.

Figure 2B:
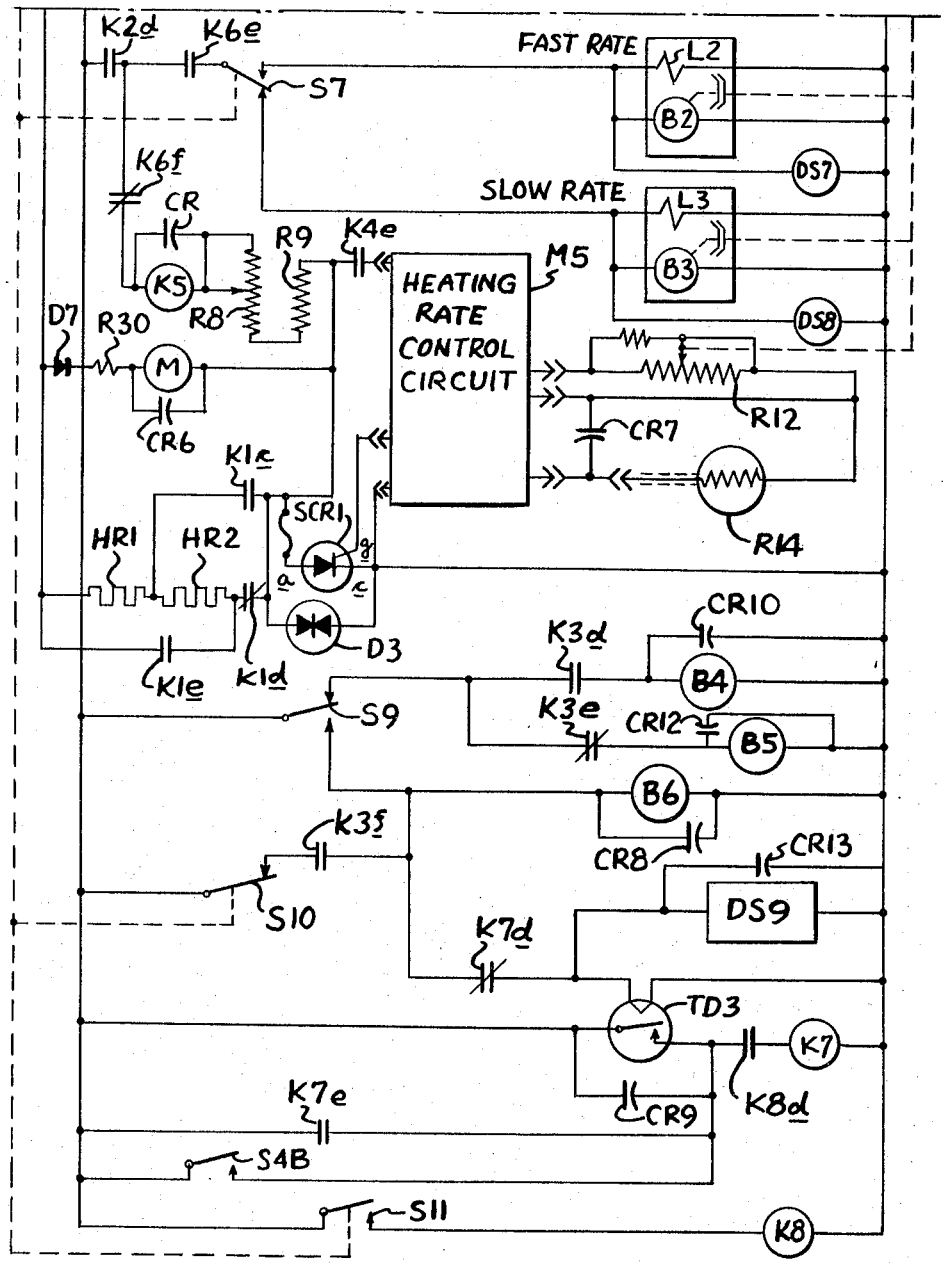

For the purpose of clarifying the explanation of the circuit diagram in FIGS. 2a and 2b, the following legends have been employed consistently throughout the diagram to designate similar elements:

B—motors
C—cams
CR—capacitors
D—diodes
DS—pilot lights
HR—heater coils
K1, K2, etc. —relays
K1a, K1b, etc. —relay contacts
L—clutch
M—circuit modules
R—resistors
S—switches
T—transformers
V—thyratrons Turning now to the detailed circuit diagram of FIGS. 2a and 2b, before the dial 50 is set to the expected flash point, a switch S1 in the main A.-C. supply line is closed so as to energize the "LINE" pilot light DS1. The closing of the line switch S1 also energizes the primary coil of the transformer T1 which, in turn, provides a filament voltage for the thyratron tube V1 as well as input voltages for various other portions of the circuit as described in more detail hereinafter.

The first of the five switches controlled by the expected flash point dial 50 is the high range switch S2. As this switch is rotated about the corresponding cam C1, the switch is closed whenever the expected flash point setting is on the high range, i.e., above 220° F. As the switch S2 is closed, it energizes a D.-C. relay K1 through a normally closed relay contact K3b, resistor R1 and R1a, and a rectifying diode D1 which rectifies the A.-C. supply for the purpose of actuating the relay K1. The resistor R1a and a capacitor CR11 form an RC network which delays the deenergization of K1 for a brief interval upon termination of the test. As the relay K1 is energized, a pilot light DS2 is also actuated to indicate that the automatic flash point tester is operating on the high range.

The relay K1 serves a number of functions. First, in cases where a dual range temperature recording device 51 is employed, the relay K1 actuates a control relay in the recorder 51 to select the proper range. Where a digital readout or other single range recording device is employed, of course, no selection of recording ranges is required. Second, the relay K1 selects the proper wattage for the heater 52 according to expected flash point, that is, the two heater coils HR1 and HR2 (FIG. 2b) are connected in series for flash point settings on the low range and in parallel for flash point settings on the high range. Since the relay K1 is energized only when the expected flash point is on the high range, it actually only changes the heater element to the parallel connection; when the expected flash point is on the low range and the relay K1 is not energized, the heater element simply remains in its normal series connection as illustrated. For the parallel connection, the relay K1 closes the normally open contacts K1c and K1e and opens the normally closed contact K1d, thereby connecting the two coils HR1 and HR2 in parallel. If the relay K1 is deenergized, the associated contacts all return to their normal positions, and the coils HR1 and HR2 are restored to their normal series connection.

The relay K1 also closes the normally open contacts K1a and K1b so as to condition the lines containing these contacts for later operations which are required when the expected flash point setting is on the high range, as described in more detail below.

The second switch controlled by the dial 50 is the safety switch S5 which is thrown to the down position by the setting of the dial 50 at any expected flash point, regardless of whether it is in the high or low range. The cam C2 associated with the safety switch S5 is adapted to throw this switch to the up position when the sample temperature is increased about 55° beyond the expected flash point setting. This actuates the safety circuit 53 which activates a safety pilot light DS4, indicating to the operator that the instrument should be reset manually for a new test, and also deactivates the sample heater and turns on the blower by breaking the circuit to K3. The "safety" situation arises whenever the cam C2 is driven past the expected flash point by a distance corresponding to about 55° or more, such as when the test flame is accidentally extinguished, or when the flash detection system fails and the heating continues beyond the 55° safety point, or when the expected flash point setting is simply far too low.

The third switch controlled by the dial 50 is the initial heat cut-off switch S6 which is thrown to the down position to deactivate an initial heat circuit 54 for any expected flash point setting on the high range. This terminates the initial heating after a predetermined period, as will be described in more detail below.

The fourth switch controlled by the dial 50 is the heating rate switch S7 which is thrown to the up or down position thereby selecting the appropriate drive motor B2 or B3 for a fast or slow heating rate, respectively, as required by the temperature program. When the expected flash point set on the dial 50 is on the low range, the switch S7 remains in the down position to select motor B3, whereas expected flash point settings on the high range throw the switch S7 to the up position to select motor B2. As will be seen from the ensuing discussion, the motors B2 and B3 are connected to a potentiometer R12 which controls a heat control circuit, which in turn controls the amount of current supplied to the heating coils HR1 and HR2. Thus, the motors B2 and B3, in effect, control the rate at which the fluid sample is heated. When the cam C3 associated with the heating rate switch S7 throws the switch to the up position as in the case of expected flash point settings on the high range, the motor B2 will cause the sample temperature to be increased at a relatively fast rate of about 25° F. per minute; when the cam C3 throws the switch S7 to the down position, the motor B3 causes the sample temperature to be increased at a relatively slow rate of about 10° F. per minute. The purpose of the fast rate is to shorten the total test time required for relatively high flash point settings, and in any case where the fast rate motor B2 is energized, it will be de-energized (simultaneously with the energization of the slow rate motor B3) when the sample temperature has been increased to approximately 150° F. below its expected flash point.

The fifth switch controlled by the dial 50 is the flame introduction switch S10 which is opened (down position) by any expected flash point setting, regardless of whether on the high or low range. The cam C4 associated with this switch is adapted to return the switch to its closed position when the sample temperature has reached approximately 20° F. below the expected flash point, thereby actuating a flame introduction circuit 55 which cyclically energizes a test flame motor B6 until termination of the test. This motor B6 is equipped with a double cam which periodically stops the stirring of the sample, opens the sample cup shutter and introduces the test flame within 0.5 second, detains the flame in the cup for 1 second, removes the test flame and closes the shutter, and starts the stirring again. This cycle is repeated every 2° F. by means which will be described in more detail hereinafter.

Having set the dial 50 and thereby set the five switches attached thereto, the operator now pushes a "start test" button to close switch S3. This closes the circuit between the thyratron V1 and the transformer T1 and thereby causes the thyratron V1 to start to conduct, thus energizing relay K2 which closes the normally open contacts K2a so as to lock the relay K2 and thyratron V1 into the circuit through its own contacts. Conduction of the thyratron V1 also activates an "on test" light DS3. The switch S3 is a momentary switch so that it returns to its open position immediately upon release of the "start test" button by the operator. The relay K2 also closes the normally open contacts K2b and, since the safety switch S5 has been previously closed (down position) by the turning of the dial 50, this results in the energizing of the relay K3. For the purpose of turning off the "start test" pilot light DS6, which is turned on at the termination of each test, the normally closed contacts K2c are opened by the relay K2. Finally, the relay K2 also closes the normally open contacts K2d to condition a relay K5 for subsequent energization.

Returning now to the relay K3, which was energized by the closing of the contacts K2b, this relay closes the normally open contacts K3a to provide power to the relay K1, and opens the normally closed contacts K3b to effectively isolate the cam-controlled switch S2. This provides a safeguard to maintain all the preselected high range settings, controlled by the relay K1, in the event that the dial 50 (and thus the switch S2) is inadvertently turned during the running of the test. It will be recognized that if the expected flash point setting is not in the high range, the contacts K1a will remain open so that the closing of the contacts K3a will have no effect on the circuit.

The relay K3 also closes the normally open contacts K3c so as to provide power to the filament of the heat delay tube TD1 in heat delay circuit 56. The energization of the relay K3 also serves to start the stirrer motor B4, located in the housing 13, by closing the normally open contacts K3d. A capacitor CR10 is connected across the motor B4 to filter transients created thereby. It will be appreciated that the stirrer motor is started immediately upon the pushing of the "start test" button S3 even though, as will be seen from the following discussion, the heating of the sample is not started at this time. The stirring of the sample in the absence of heating is continued for approximately 30 seconds in order to allow the sample and the sensing elements to come to a thermal equilibrium. Simultaneously, with the starting of the stirrer motor, the blower motor B5 is stopped by the opening of the normally closed contacts K3e, and the blower motor remains off for the duration of the test. The blower is started again upon termination of the test, when the contacts K3e return to their normally closed position, for the purpose of cooling the instrument between tests. Finally, the relay K3 also closes the normally open contacts K3f to condition the flame introduction motor B6 for subsequent activation by the return of the flame introduction switch S11 to the up or closed position.

Since the heating of the filament of the heat delay tube TD1 has been started by the closing of the contacts K3c, this tube continues to heat until the contacts inside the tube close after a predetermined period, suitably 30 seconds. The tube TD1 then becomes conductive, thus supplying power to the filament of an initial heat tube TD2 and also energizing a relay K4 which, in turn, opens the normally closed contacts K4a to immediately turn off tube TD1. At the same time, the normally open contacts K4b are closed so as to shunt the tube TD1 and lock the relay K4 into the circuit through its own contacts. It will be appreciated that the tube TD1, and its associated capacitor CR3, serve merely as a delaying means so that the heating of the fluid sample is not commenced until some predetermined period after the pressing of the "start test" button, during which period the sample is continuously stirred to establish the desired thermal equilibrium.

As the relay K4 is energized by the conduction of the heat delay tube TD1, it closes normally open contacts K4c and K4d to activate an initial heating motor B1 and its clutch L1. At the same time, the normally open contacts K4e are closed to actuate the heating rate control circuit M5, causing current to flow through heating coils HR1 and HR2 and to condition the relay K5 for energization. As illustrated schematically in FIGS. 2a and 2b, the initial heating motor B1 advances the contact on a multi-turn potentiometer R12 which forms one leg of a bridge network associated with the control circuit M5. The other legs of the bridge are R14, which is a temperature sensing element, such as a platinum resistance bulb or the like, immersed in the fluid sample, and two fixed resistors in the control circuit (see FIG. 5) which will be described in more detail below. A capacitor CR7 is provided to filter A.-C. transients.

As the initial heating motor B1 advances the contact on the potentiometer R12, the resistance of this leg of the bridge increases rapidly until it exceeds the resistance value of the other variable leg of the bridge formed by the sample temperature sensing element R14. The continuing advance of the potentiometer contact causes the bridge to become unbalanced, due to the lag in the sensing element resistance R14 with respect to the resistance R12, thereby developing a voltage across the relay K5 via the control circuit M5, which will be described in detail below. When this out-of-balance bridge voltage reaches a predetermined level, the relay K5 is energized and opens the normally closed contacts K5a, K5b and K5c so as to deenergize the motor B1. The control circuit continues the flow of current through the heating coils HR1 and HR2, thereby continuing the supply of heat to the fluid sample and the sensing element immersed therein so as to tend to return the system to balance. The out-of-balance voltage required to energize the relay K5 is determined by resistors R8 and R9, and R8 is variable to permit adjustment of such voltage.

When the out-of-balance voltage drops to a predetermined level, the relay K5 is deenergized, thus restoring the contacts K5a, b and c to their normal position. This starts the initial heating motor again and the cycle is repeated in the manner described. This repetitive heating cycle is continued for a predetermined period, suitably three to four minutes, as determined by the initial heat tube TD2. It will be recalled that power was supplied to the filament of the tube TD2 at the same time that the relay K4 was energized by conduction of the heat delay tube TD1. As the control circuit M5 and the initial heating motor B1 go through their respective cycling, power is continuously supplied to the tube TD2 until this tube becomes conductive. This energizes a relay K6 which functions to terminate the initial heating period. Thus, it can be seen that the length of the initial heating period is actually determined by the time required to render the tube TD2 conductive (thus the term "initial heat" tube). A capacitor CR4 is connected across the tube TD2 to protect its contacts.

In order to terminate the cyclic initial heating, the relay K6 opens normally closed contacts K6c and K6d so as to deenergize the initial heating motor B1. At the same time, the relay K6 opens the contacts K6a in the filament power supply line for tube TD2, cutting off the tube, and closes contacts K6b so as to shunt the tube TD2 and lock the relay K6 into the circuit through its own contacts. It will be appreciated that this initial heating system enables a sample of any initial temperature to be used without any substantial lost time. For example, when preheated samples of relatively high flash points are used, there is very little time loss in advancing the potentiometer from its initial 32° F. position to the initial sample temperature, because the initial heating motor B1 quickly brings the potentiometer contact up to the desired starting point. Furthermore, perhaps more important than any of the points mentioned above, the cyclic initial heating tends to bring the entire test system into thermal equilibrium before initiating any temperature programming. Consequently, there are no wide fluctuations in the designed temperature-time profile due to thermal lags and the like.

In order to provide an indication of the changing voltage to the heater, a D.-C. voltmeter M is connected across K5, R8, and R9 and is mounted on the front panel of the instrument. A capacitor CR6 filters A.-C. ripple to the voltmeter M, while a diode D7 forces the capacitor to discharge through the meter. A resistor R30 limits current to the meter. It should be noted that the meter M indicates a reference voltage only and is not a true voltage indicator.

Returning now to the heating rate control circuit M5 for a more detailed description thereof, and referring particularly to FIG. 5, the control circuit includes a control switching element or static-latching switch SCR1 (see FIG. 2b) which controls the supply of power to the heating elements HR1 and HR2. More particularly, the control switching element SCR1 controls the periods of supply and nonsupply of power to the heating elements. The control switching element is disclosed as a silicon-controlled rectifier having an anode, a cathode and a gate-electrode, respectively designated as a, c and g. A thyrector diode D3 is connected in parallel with the rectifier SCR1 and is provided to suppress surge voltages whereby the semiconductor components employed in the condition controlling apparatus are provided with transient voltage protection.

For the purpose of triggering the rectifier SCR1 to condition, a unijunction transistor TR1 is provided. A control capacitor CR1 is connected in the emitter or control input circuit of the unijunction transistor TR1 for controlling the operation of the transistor in accordance with the charge on the capacitor. As may be seen, the capacitor CR1 is connected across the output of a differential amplifier 70 so that the capacitor charges toward the voltage level of the output signal produced by the differential amplifier at a rate dependent upon the amplitude of the output voltage signal. When the charge on the capacitor CR1 attains a prescribed level, the unijunction transistor TR1 is rendered conductive and the capacitor CR1 is permitted to discharge therethrough. This drives the gate electrode of the rectifier SCR1 positive with respect to the cathode thereof and the rectifier is thereby conditioned for conduction. Moreover, the rectifier SCR1 is rendered conductive when the capacitor CR1 discharges during a positive half-cycle of the A.-C. supply so that power is applied to the heating element during the remaining portion of that positive half-cycle.

In view of the foregoing, it follows that the power supplied to the heating elements may be regulated by regulating the times during the half-cycles of the A.-C. supply at which the rectifier SCR1 is rendered conductive. Further, it will be readily appreciated that the times at which the rectifier SCR1 is rendered conductive may be regulated by regulating the time required during the half-cycles of the A.-C. supply for the capacitor CR1 to charge to the prescribed level whereat the unijunction transistor TR1 is rendered conductive. Since the time required for the capacitor CR1 to charge to the prescribed level is dependent upon the amplitude of the voltage signal produced by the differential amplifier 70, it follows that the times during the half-cycles of the A.-C. supply at which the rectifier SCR1 is rendered conductive is dependent upon the difference between the resistance values of the potentiometer R12 and the temperature sensing element R14. Moreover, it follows that, as the temperature of the sample increases, the rectifier SCR1 will be rendered conductive at later times during the half-cycles of the A.-C. supply so that the power supplied to the heating elements is decreased, i.e., the power supplied to the heating elements varies inversely with changes in the sample temperature.

The basic components of the differential amplifier 70 are interconnected in a conventional manner. As may be seen, the differential amplifier includes a pair of control transistors TR2 and TR3, each having a base, a collector and an emitter, respectively designated as b, c and e. For precise operation of the differential amplifier, the transistors are preferably matched transistors. Main input power is supplied to the differential amplifier 70 by the A.-C. source through rectifying diode D4. For the purpose of limiting the voltage signal actually supplied to the differential amplifier, the rectified A.-C. voltage signal is "clipped" by a pair of Zener diodes D5 and D6 which are connected in series with a resistor R13 across the differential amplifier. The Zener diodes D5 and D6 provide regulated "clipped" power supplies for the differential amplifier.

The collectors of the control transistors TR2 and TR3 are connected to the upper terminal of the Zener diode D5 through respective collector circuit resistor R11 and R21. On the other hand, the emitters of the transistors TR 2and TR3 are connected together and are connected to the lower terminal of the Zener diode D6 through a common resistance network including a constant resistor R22 and a potentiometer P2. Consequently, the "clipped" voltage signal is supplied to the collector-emitter circuits of the control transistors TR2 and TR3.

For the purpose of applying control input signals to the bases or control inputs of the control transistors TR2 and TR3 and thus for the purpose of controlling the conduction of the control transistors, input control networks in the form of voltage-dividing networks are associated with the bases of the transistors. The input control network associated with the base of transistor TR2 includes a pair of fixed resistors R16 and R17 and a potentiometer P1 connected in series. The input control network is connected across the Zener diode D5 and the base of transistor TR2 is connected to the contact arm of the potentiometer P1. Thus, the power supplied to this control network is limited by the Zener diode D5. As will be readily apparent, the potential at the base of transistor TR2 is dependent upon the presetting of the potentiometer P1. The control network associated with the base of transistor TR3 includes the series arrangement of a fixed resistor R18, the previously mentioned potentiometer R12 and the previously mentioned temperature-sensing resistance element R14. This control network is likewise connected across the Zener diode D5 and the base of transistor TR3 is connected to the common terminal between the resistance element R14 and the potentiometer R12. Consequently, the potential at the base of transistor TR3 is dependent upon the resistance values of the resistance element R14 and the potentiometer R12.

The amount of conduction of the control transistors TR2 and TR3 is dependent upon the differential potential between the bases and emitters thereof. Since the disclosed control transistors are of the NPN type, the transistors are conductive only when the bases thereof are positive with respect to the emitters. Since the emitters of the transistors are connected together, the potential at the emitters is dependent upon the cumulative amount of conduction through the transistors. On the other hand, the potential at the base of transistors TR2 is dependent upon the presetting of the potentiometer P1, whereas the potential at the base of transistor TR3 is dependent upon the resistance values of the potentiometer R12 and the resistance element R14. It follows that differential conduction of the control transistors exists only when the bases thereof are at different potentials.

The output for the differential amplifier 70 is taken off the collector of the transistor TR3 in the exemplary arrangement so that an output voltage signal is produced having a value equal to the potential at the collector of transistor TR3. When the transistor TR3 is nonconductive, the collector thereof is at substantially the same potential as the "clipped" signal developed across the Zener diodes D5 and D6 and the voltage drop produced across the collector circuit resistor R12. Since the voltage drop developed across the resistor R12 is dependent upon the amount of conduction of the transistor TR3, it follows that the amplitude of the output signal produced by the differential amplifier is likewise dependent upon the amount of conduction of the transistor TR3. The amount of conduction of transistor TR3 is dependent upon the resistance values of the potentiometer R12 and the resistance element R14 and the amount of conduction of transistor TR2. Thus, the output voltage signal produced by the differential amplifier 70 is dependent upon the difference between the resistance values of the potentiometer R12 and the resistance element R14.

With a differential amplifier as thus far described, the output voltage signal produced thereby varies inversely and exponentially with changes in the potential at the base of the transistor TR3 and thus inversely and exponentially with changes in the difference between the instantaneous sample temperature and the desired final temperature to be attained therein. If this output voltage signal is applied directly to the capacitor CR1 to control the charging thereof, it will be readily apparent that, as the difference between the instantaneous sample temperature and the final temperature to be attained therein varies, the angular positions during the half-cycles of the A.-C. supply at which the rectifier SCR1 is rendered conductive will likewise vary inversely and exponentially with changes in the difference therebetween. For more accurate controlling of the temperature of the sample, it is desirable for the angular position at which the rectifier SCR1 is rendered conductive to be varied substantially linearly with the changes in the difference between the instantaneous sample temperature and the desired final temperature to be attained therein. Consequently, in order to provide for such more accurate controlling, means must be provided for causing the output voltage signal produced by the differential amplifier to vary substantially linearly with changes in the difference between the resistance values of the potentiometer R12 and the resistance element R14.

Accordingly, means have been associated with the output of the differential amplifier 70 for causing the output voltage signal produced thereby to vary substantially linearly with changes in the amplitude of the control input signal applied to the base of the transistor TR3, i.e., with changes in the difference between the resistance values of the potentiometer R12 and the resistance element R14. More specifically, an R-C network including a resistor R20 and a capacitor CR2, connected in parallel, is interposed between the collector of transistor TR3 and the control capacitor CR1 for causing a voltage signal to be applied to the capacitor CR1 which varies substantially linearly with changes in the difference between the resistance of R12 and R14. The control capacitor CR1 and the capacitor CR2 in the R-C network are thus connected in series across the output of the conventional differential amplifier 70.

The capacitor CR2 is selected to have a greater capacitance value than the capacitor CR1 so that the capacitor CR1 charges more rapidly than capacitor CR2 when an output voltage signal is produced at the collector of transistor TR3. Consequently, the capacitor CR1 initially charges rapidly toward the potential at the collector of transistor TR3 and toward the prescribed voltage level at which the unijunction transistor TR1 is rendered conductive. At the same time, a charge is being atttained more slowly on the capacitor CR2 which exponentially decreases the output voltage signal produced by the differential amplifier and thus exponentially decreases the voltage signal applied to the capacitor CR1. That is, the actual voltage signal applied to the capacitor CR1 is equal to the difference between the voltage signal produced at the collector of transistor TR3 and the charge attained on the capacitor CR2. It follows that, as the charge on the capacitor CR2 increases, the control capacitor CR1 charges at a correspondingly slower rate toward the level at which the unijunction transistor TR1 is rendered conductive. When the voltage signal produced at the collector of transistor TR3 has a relatively high amplitude, a charge is attained on the capacitor CR2 during a given half-cycle of the A.-C. supply which corresponds to a greater percentage of the voltage signal produced at the collector than is attained when the voltage signal produced at the collector has a relatively low amplitude. This is due to the charging relationship between the capacitors CR1 and CR2. With this relationship, the output voltage signal produced by the modified differential amplifier 70, i.e., the voltage signal applied to the capacitor CR1 varies substantially linearly with changes in the difference between the resistance values of R12 and R14.

The potentiometer P1 is provided in the control network associated with the base of transistor TR2 to allow for balancing the differential amplifier so that, when the temperature of the sample attains a prescribed level, a differential amplifier output is produced which causes the rectifier SCR1 to be rendered conductive midway during the half-cycles of the A.-C. supply, i.e., the rectifier is rendered conductive at the 90° phase angle during the respective half-cycles of the A.-C. supply. The potentiometer P2 is provided in the emitter circuits of the transistors TR2 and TR3 to allow for calibrating the differential amplifier so that sufficient current flows through the transistor TR3, when the prescribed balancing temperature is attained in the sample as determined by the presetting of the balancing potentiometer P1, to cause a prescribed amplitude output voltage signal to be produced which causes the rectifier to be rendered conductive at the 90° phase angle. Additionally, a potentiometer P3 is connected in parallel with the control capacitor CR1 for presetting the system so that a prescribed change in the resistance value of the resistance element R14 is required to cause the rectifiers to be rendered conductive at opposite extremes of half-cycles of the A.-C. supply, i.e., at 0° and 180° phase angles. Thus, the potentiometer P3 is a bandwidth establishing potentiometer.

Returning now to FIGS. 2a and 2b, for the purpose of controlling the heating rate of the fluid test sample after termination of the initial heating step, the relay K6 closes normally open contacts K6e so as to energize one of the heating rate motors B2 or B3 previously selected by the heating rate switch S7. At the same time, relay contacts K6f are opened so as to effectively remove the relay K5 from the circuit for the balance of the test, so that there is no further cyclic operation. In order to indicate to the operator which of the heating rate motors has been selected, a corresponding indicator light DS7 or DS8 is turned on simultaneously with the selected heating rate motor. Thus, if the fast rate motor B2 is energized, the "fast rate" indicator light DC7 is activated, and if the slow rate motor B3 is energized, the "slow rate" indicator light DS8 is activated.

The heating rate motors B2 and B3 are both connected to the potentiometer R12 so that as the motor B2 or B3 is energized, the potentiometer contact is advanced at a predetermined fast or slow rate, depending on which of the motors has been selected by the switch S7. Thus, if the switch S7 has selected the fast rate motor B2 in response to an expected flash point setting on the high range, the potentiometer contact is initially advanced at a rate designed to increase the sample temperature at a rate of 25° F. per minute; if the switch S7 has selected the slow rate motor B2, the potentiometer contact is advanced at a rate designed to increase the sample temperature at a rate of 10° F. per minute. It will be appreciated that this system substantially shortens the test time for samples having expected flash points in the high range, because the temperature of such samples is automatically increased at a substantially faster rate during the early portion of the test.

In order that the samples having expected flash points in the high range may be heated at the ASTM-prescribed (slow) rate as its temperature approaches the expected flash point, means are provided for switching from the fast heating rate to the slow heating rate at a predetermined point below the expected flash point. Thus, the heating rate switch S7 is operatively connected to a cam C3 which is designed to throw the switch S7 from the fast rate motor B2 to the slow rate motor B3 when the sample temperature reaches a point about 150° F. below the expected flash point. For this purpose, the cam C3 is driven by the motors B1, B2 and B3 so that it is rotated at a speed proportional to the rate of advance of the potentiometer contact driven by the motors B1, B2 and B3. Consequently, when the potentiometer contact has been advanced to a point corresponding to a sample temperature 150° F. below the expected flash point, the cam C3 has been advanced to a similarly corresponding point, and the switch S7 is thrown to de-energize the motor B2 and energize the motor B3. It will be recognized, of course, that this switching system operates only in those cases where the fast rate motor B2 has been initially selected in response to an expected flash point setting in the high range; when the expected flash point setting is in the low range, the switch S7 selects the slow rate motor B3 in the first instance, and the cam C3 simply rides over the switch S7 without changing its position.

In accordance with a further aspect of the invention, means are provided for terminating the initial heating and by-passing the fast heating stage in cases where the test sample is initially at a temperature within the slow heating range, e.g., within 150° F. of the expected flash point. Thus, even if the sample has an extremely high expected flash point, it may already be at a temperature within 150° F. of that point when placed in the test cup. In such a case, the potentiometer contact will be rapidly advanced to the initial sample temperature by the initial heating motor B1, and the cam C3, which is driven by motor B1 as well as the heating rate motors B2 and B3, throws the switch S7 from the fast rate motor B2 to the slow rate B3 immediately, so that the fast rate motor B2 is never even energized. At the same time, the cam C3 throws the initial heat cutoff switch S6 to the up position in FIG. 2a, thereby shunting the initial heat tube TD2 and terminating the initial heating stage instantly. As the tube TD2 is shunted by the switch S6, of course, the relay K6 is energized the same as it would be upon conduction of tube TD2 and, consequently, the operations which follow are the same as in the case of a normal termination of the initial heating by conduction of tube TD2. It will be appreciated that this feature again shortens the overall test time without sacrificing any of the automatic functions of the machine of this invention.

After one of the heating rate motors B2 or B3 has been activated by the closing of relay contacts K6e, that motor advances the contact of potentiometer R12 at a predetermined rate so as to unbalance the bridge circuit associated with the control circuit M5 and thereby supply power to the heating coils HR1 and HR2. The control circuit functions in the same manner described above in connection with the initial heating motor B1, except that the relay K5 is now out of the circuit (due to the opening of contacts K6f). Consequently, the operation of the motor and the supply of power to the heating coils are continuous rather than cyclic, thus taking full advantage of the proportional output from the control circuit M5. Thus, if the rate of change of the resistance of the temperature sensing element R14 immersed in the fluid sample lags behind the controlled rate of change of the potentiometer R12, the control circuit M5 functions to supply additional power to the heating coils so as to maintain the bridge network including these resistances in a balanced condition.

In accordance with one feature of the invention, control means are provided for automatically initiating periodic introduction of the test flame and the flash detecting element when the sample temperature has reached a predetermined point below the expected flash point. Thus, as the motors B1 and B2 or B3 advance the contact in potentiometer R12, they simultaneously rotate cam C4 which is designed to close the flame introduction switch S10 when the sample has been heated to approximately 20° F. below the expected flash point. As the switch S10 is closed, it energizes a flame introduction motor B6 through previously closed contacts K3f and simultaneously supplies power to the filament of a false flash tube TD3, the function of which will be described below. If desired, a warning device such as a buzzer DS9 may also be included in the circuit to warn the operator that flame introduction is being initiated; this is useful mainly in applications where the temperature at which the flash occurs is to be observed and manually recorded rather than by the use of an automatic temperature recording device. A capacitor CR13 is connected across the buzzer DS9 to filter transients created thereby.

Returning to the flame introduction motor B6, this motor drives a double cam C6, one part of which is connected to a stirring interrupter switch S9 (capacitor CR8 filters transients created by the motor B6). This part of the cam is designed to throw the switch S9 to the down position and thereby turn off the stirring motor B4 while the flame is being introduced, in accordance with the ASTM-prescribed procedure, and then return the switch to the up position to start the stirring motor B4 again after the flame has been retracted. The other part of the double cam C6 connected to the motor B6 is operably connected to the control rod 28 of the sample cup shutter mechanism, and is designed to open the shutter, maintain it open for a predetermined period, and then close the shutter again. Of course, each time the shutter is opened, the camming connection with the flame assembly 30 causes the test flame and the flash detector to be lowered into the head space of the sample cup. The flame and detector remain within the cup while the shutter is open, and are then automatically withdrawn as the shutter is closed again. The preferred timing for this cycle of operation is one-half second for flame introduction, a one second dwell period during which the flame and detector remain within the cup, and one-half second for flame retraction. This cycle is repeated for every 2° F. increase in the sample temperature (based on heating rate of 10° F. per minute), as determined by the speed of motor B6 and the cam connected thereto. It will be appreciated that since the detector probe is inserted into the cup only when the flame is introduced, there is no opportunity for heavy vapors or condensation to form on electrical leakage path. Consequently, maximum sensitivity is maintained in the detection system so that even the smallest flashes can be detected.

In accordance with another aspect of the invention, means are provided for automatically detecting a flash within the head space of the sample cup and terminating the test in response to such a flash. Thus, the flash detector probe 33 mounted on the flame assembly is electrically charged by the positive terminal of a battery BT1, which is also operably connected to the grid of the thyratron V1. The cup cover 16 is grounded so that as the probe 33 is inserted through the cover into the cup head space, the small air gap between the grounded cover and the charged probe acts as an impedance which is applied to the grid of the thyratron V1. When a flash occurs within the cup, the ionized vapors in the air gap change the impedance momentarily so that a negative pulse from the battery is applied to the thyratron grid, thereby rendering the thyratron nonconductive for a brief interval. This de-energizes the relay K2 thereby restoring all the K2 contacts to their normal conditions and terminating the test.

Upon the de-energization of K2, contacts K2a open to open the circuit to V1, and contacts K2b open to de-energize relay K3. At the same time, contacts K2c close to energize the "start test" light DS6, and contacts K2d open to break the circuit to K5 and the heat control circuit M5. The de-energization of K3 stops the stirrer motor B4, stops the flame introduction motor B6, starts the blower motor B5, and de-energizes relay K4. Thus, it can readily be seen that the de-energization of K2 initiates a chain of events which instantly terminate the test.

In addition to the battery BT1, the grid circuit of the thyratron V1 includes a resistor R6 for limiting the battery current, a resistor R5 for the DC signal at the flash, and a variable resistor R4 for making sensitivity adjustments in the flash detector circuit. Resistors R2 and R3 act as voltage dividers, while a capacitor CR2 connected across the resistor R3 serves as a phase shift capacitor for the thyratron V1.

If desired, the flash detector circuit may be connected to an automatic temperature recorder, such as a conventional dual range potentiometer recorder or a direct digital readout device, which holds the temperature reading at the flash point. For example, such a recorder could be connected to the leads 52a and 53a illustrated in FIG. 2a, with the normally open relay contacts K2e serving to deactivate the recorder upon the occurrence of a flash to freeze the temperature reading at the flash point.

As another feature of the invention, means are provided for automatically indicating when a false flash occurs. Thus, it will be recalled that when the first flame introduction cycle was initiated by the switch S10, power was also supplied to the tube TD3. The purpose of this tube TD3 is to delay the energization of a relay K7 until the first flame introduction cycle has been completed. Consequently, if a flash occurs on the first flame introduction, the thyratron V1 is still cut off to terminate the test, but a false flash light DS5 is activated through normally closed relay contacts K7c to indicate to the operator that the detected flash was a false one. In other words, the sample temperature had already passed the true flash point before the first flame introduction, so the results should be disregarded, the instrument reset, and the test repeated at a lower expected flash point setting on the dial 50.

After the first flame introduction, the false flash tube TD3 (the contacts of which are protected by capacitor CR9) becomes conductive so as to energize the relay K7, thereby opening normally closed contacts K7d and closing normally open contacts K7e to shunt the tube TD3 and lock the relay K7 into the circuit through its own contacts. At the same time, the relay K7 closes normally open contacts K7a and K7b to condition the motor B1 to automatically reset the instrument for the next test. Thus, when relays K2, K3, K4, and K6 are de-energized to terminate the test, contacts K4c and K4d open and contacts K5b and K2c close so as to energize the motor B1 in the reverse direction. Consequently, motor B1 drives both the contact of potentiometer R12 and the cams C1–C5 in the reverse direction. Since motor B5 is reversible, a capacitor CR5 is connected thereacross.

When the motor B1 was first energized during the initial heating stage, it rotated a cam C5 which immediately closed to reset stop switch S11 so as to energize a relay K8. This opened contacts K8a to isolate the "start test" switch S3, opened contacts K8c to open the circuit to the "start test" light DS6, and closed contacts K8b to condition the false flash light DS5 for subsequent energization. Now when the cam C5 has been returned to its original position by the reverse drive of the motor B1, the cam C5 opens the reset stop switch S11 so as to de-energize the relay K8. This opens contacts K8d to de-energize the relay K7, thereby restoring contacts K7a and K7b to their normally open positions to deactivate the reset motor B1. At the same time, contacts K8c are closed to turn on the "start test" light DS6 thereby indicating to the operator that the instrument is ready for the next test, and contacts K8a are closed to enable the switch S3 to initiate another test.

When a flash occurs on the first flame introduction, i.e., a false flash, the relay K7 has not yet been energized and, consequently, the motor B1 is not conditioned for automatic resetting. Similarly, whenever the safety switch S5 is thrown by an increase in the sample temperature 55° F. beyond the expected flash point, the relay K2 is not de-energized and, consequently, the motor B1 again is not conditioned for automatic resetting. Thus, in either of these situations, which are indicated by the energization of the "false flash" light DS5, or the "safety" light DS4, the operator must initiate the resetting operation manually by pressing a reset button 80. When the reset button 80 is pressed, it (1) closes switch S4A momentarily to render the thyratron V1 nonconductive and thereby de-energize relay K2 and (2) closes switch S4B to energize relay K7. As a result, the manually initiated resetting operation is carried out in the same manner described above in connection with the automatic reset. Moreover, when the reset stop switch S11 is opened by the cam C5 to de-energize relay K8, contacts K8b are opened to turn off the "false flash" light DS5. At the same time, the return of cam C2 to its original position throws "safety" switch S5 to its normal down position to turn off the "safety" light DS4.

We claim as our invention:

1. In an automatic flash point testing instrument including means for holding the sample to be tested in a substantially closed container having a vapor region above the sample and temperature sensing means for sensing the temperature of the sample in said container, manually operated control means for setting an expected flash point for the sample, a heater for increasing the temperature of the sample in the container to its flash point, stirring means for stirring the sample in the container at a prescribed rate, a test flame assembly including means for periodically introducing a test flame into said vapor region for the purpose of igniting the vapors therein, a flash detection means for detecting a flash due to the ignition of the vapors upon the introduction of the test flame into said vapor region, a manually operated test initiation means and automatic control means responsive to said test initiation means for actuating and stirring means, a temperature control system comprising the combination of time delay means operatively associated with said heater and said test initiation means for delaying the initiation of the heating of the sample for a predetermined period after the actuation of said stirring means so as to tend to bring the sample and the instrument into thermal equilibrium, initial heating control means responsive to said time delay means and said sample temperature sensing means for rapidly advancing the temperature control system to the initial sample temperature, said initial heating control means including means for continuously heating the sample for a predetermined initial heating period while cyclically advancing the temperature control system in response to increases in the sample temperature so as to bring the sample into a controlled rate of thermal advance, and heating rate control means operatively associated with said initial heating control means for continuing the heating of the sample at a predetermined rate upon termination of said initial heating period.

2. In an automatic flash point testing instrument including means for holding the sample to be tested in a substantially closed container having a vapor region above the sample and temperature sensing means for sensing the temperature of the sample in said container, manually operated control means for setting an expected flash point for the sample, a heater for increasing the temperature of the sample in the container to its flash point, stirring means for stirring the sample in the container at a prescribed rate, a test flame assembly including means for periodically introducing a test flame into said vapor region for the purpose of igniting the vapors therein, a flash detection means for detecting a flash due to the ignition of the vapors upon the introduction of the test flame into said vapor region, a manually operated test initiation means and automatic control means responsive to said test initiation means for actuating said stirring means, a temperature control system comprising initial heating control means responsive to said sample temperature sensing means for rapidly advancing the temperature control system to the initial sample temperature, said initial heating control means including means for continuously heating the sample for a predetermined initial heating period while cyclically advancing the temperature control system in response to increases in the sampling temperature so as to bring the sample into a controlled rate of thermal advance, and heating rate control means operatively associated with said initial heating control means for continuing the heating of the sample at a predetermined rate upon termination of said initial heating period.

3. In an automatic flash point testing instrument including means for holding the sample to be tested in a substantially closed container having a vapor region above the sample and temperature sensing means for sensing the temperature of the sample in said container, manually operated control means for setting an expected flash point for the sample, a heater for increasing the temperature of the sample in the container to its flash point, stirring means for stirring the sample in the container at a prescribed rate, a test flame assembly including means for periodically introducing a test flame into said vapor region for the purpose of igniting the vapors therein, a flash detection means for detecting a flash due to the ignition of the vapors upon the introduction of the test flame into said vapor region, a manually operated test initiation means and automatic control means responsive to said test initiation means for actuating said stirring means, a temperature control system comprising the combination of time delay means operatively associated with said heater and said test initiation means for delaying the initiation of the heating of the sample for a predetermined period after the actuation of said stirring means so as to tend to bring the sample and the instrument into thermal equilibrium, initial heating control means responsive to said time delay means and said sample temperature sensing means for rapidly advancing the temperature control system to the initial sample temperature, said initial heating control means including means for continuously heating the sample for a predetermined initial heating period while cyclically advancing the temperature control system in response to increases in the sample temperature so as to bring the sample into a controlled rate of thermal advance, and heating rate control means responsive to the expected flash point setting and to the termination of said initial heating period for heating samples having expected flash points in a predetermined high range at a prescribed fast heating rate up to a predetermined point below the expected flash points, and then automatically switching to a prescribed slow heating rate for the balance of the test, said heating rate control means being adapted to bypass said fast heating rate stage for samples having expected flash points in a predetermined low range.

4. In an automatic flash point testing instrument including means for holding the sample to be tested in a substantially closed container having a vapor region above the sample and temperature sensing means for sensing the temperature of the sample in said container, manually operated control means for setting an expected flash point for the sample, a heater for increasing the temperature of the sample in the container to its flash point, stirring means for stirring the sample in the container at a prescribed rate, a test flame assembly including means for periodically introducing a test flame into said vapor region for the purpose of igniting the vapors therein, a flash detection means for detecting a flash due to the ignition of the vapors upon the introduction of the test flame into said vapor region, a manually operated test initiation means and automatic control means responsive to said test initiation means for actuating said stirring means, a temperature control system comprising the combination of initial heating control means responsive to said sample temperature sensing means for rapidly advancing the temperature control system to the initial sample temperature, said initial heating control means including means for continuously heating the sample for a predetermined initial heating period while cyclically advancing the temperature control system in response to increases in the sample temperature so as to bring the sample into a controlled rate of thermal advance, heating rate control means responsive to the expected flash point setting and to the termination of said initial heating periods for heating samples having expected flash points in a predetermined high range at a prescribed fast heating rate up to a predetermined point below the expected flash point, and then automatically switching to a prescribed slow heating rate for the balance of the test, said heating rate control means being adapted to bypass said fast heating rate stage for samples having expected flash points in a predetermined low range, and means operatively associated with said heating rate control means and said initial heating control means and responsive to the expected flash point setting and to the sample temperature sensing means for terminating the initial heating stage and bypassing the fast heating rate stage in response to a sample temperature within a predetermined range below the expected flash point.

5. In an automatic flash point testing instrument including means for holding the sample to be tested in a substantially closed container having a vapor region above the sample and temperature sensing means for sensing the temperature of the sample in said container, manually operated control means for setting an expected flash point for the sample, a heater for increasing the temperature of the sample in the container to its flash point, stirring means for stirring the sample in the container at a prescribed rate, a test flame assembly including means for periodically introducing a test flame into said vapor region for the purpose of igniting the vapors therein, a flash detection means for detecting a flash due to the ignition of the vapors upon the introduction of the test flame into said vapor region, a manually operated test initiation means and automatic control means responsive to said test initiation means for actuating said stirring means, a temperature control system comprising the combination of heating rate control means responsive to the expected flash point setting for heating samples having expected flash points in a predetermined high range at a prescribed fast rate up to a predetermined point below the expected flash point, and then automatically switching to a prescribed slow heating rate for the balance of the test, said heating rate control means being adapted to bypass said fast heating rate stage for samples having expected flash points in a predetermined low range, automatic resetting means responsive to said flash detection means for automatically resetting the instrument for a new test in response to the detection of a flash on any flame introduction other than the first, and false flash means operatively associated with the flame introduction means and the flash detection means for automatically terminating the test in response to a flash on the first flame introduction, said false flash means including means operatively associated with said automatic resetting means for disabling said automatic resetting means during the first flame introduction.

6. In an automatic flash point testing instrument including means for holding the sample to be tested in a substantially closed container having a vapor region above the sample and temperature sensing means for sensing the temperature of the sample in said container, manually operated control means for setting an expected flash point for the sample, a heater for increasing the temperature of the sample in the container to its flash point, stirring means for stirring the sample in the container at a prescribed rate, a test flame assembly including means for periodically introducing a test flame into said vapor region for the purpose of igniting the vapors therein, a flash detection means for detecting a flash due to the ignition of the vapors upon the introduction of the test flame into said vapor region, a manually operated test initiation means and automatic control means responsive to said test initiation means for actuating said stirring means, a temperature control system comprising heating rate control means responsive to the expected flash point setting for heating samples having expected flash points in a predetermined high range at a prescribed fast rate up to a predetermined point below the expected flash point, and then automatically switching to a prescribed slow heating rate for the balance of the test, said heating rate control means being adapted to bypass the fast heating rate stage for samples having expected flash points in a predetermined low range, and safety control means responsive to the sample temperature sensing means and to the expected flash point setting for automatically terminating the test in response to an increase in the sample temperature to a predetermined point above the expected flash point.

7. In an automatic flash point testing instrument including means for holding the sample to be tested in a substantially closed container having a vapor region above the sample and temperature sensing means for sensing the temperature of the sample in said container, manually operated control means for setting an expected flash point for the sample, a heater for increasing the temperature of the sample in the container to its flash point, stirring means for stirring the sample in the container at a prescribed rate, a test flame assembly including means for periodically introducing a test flame into said vapor region for the purpose of igniting the vapors therein, a flash detection means for detecting a flash due to the ignition of the vapors upon the introduction of the test flame into said vapor region, a manually operated test initiation means and automatic control means responsive to said test initiation means for actuating said stirring means, a test control system comprising the combination of false flash means operatively associated with the flame introduction means and the flash detection means for automatically terminating the test in response to a flash on the first flame introduction, safety control means responsive to the sample temperature and to the expected flash point setting for automatically terminating the test in response to an increase in the sample temperature to a predetermined point above the expected flash point, and resetting means operatively associated with the flash detection means for automatically resetting the instrument in response to termination of the test upon detection of a true flash, said resetting means including a manually operated reset element and control means operatively associated with said false flash means and said safety control means for bypassing the automatic resetting means in response to a test termination by said false flash means or said safety control means and for resetting the instrument only in response to said manually operated reset elements.

8. In an automatic flash point testing instrument including means for holding the sample to be tested in a substantially closed container having a vapor region above the sample and temperature sensing means for sensing the temperature of the sample in said container, manually operated control means for setting an expected flash point for the sample, a heater for increasing the temperature of the sample in the container to its flash point, stirring means for stirring the sample in the container at a prescribed rate, a test flame assembly including means for periodically introducing a test flame into said vapor region for the purpose of igniting the vapors therein, a flash detection means for detecting a flash due to the ignition of the vapors upon the introduction of the test flame into said vapor region, a manually operated test initiation means and automatic control means responsive to said test initiation means for actuating said stirring means, a test control system comprising the combination of false flash means operatively associated with the flame introduction means and the flash detection means for automatically terminating the test in response to a flash on the first flame introduction, safety control means responsive to the sample temperature and to the expected flash point setting for automatically terminating the test in response to an increase in the sample temperature to a predetermined point above the expected flash point, and resetting means operatively assoicated with the flash detection means for automatically resetting the instrument in response to termination of the test upon detection of a true flash, said resetting means including a manually operated reset element and control means operatively associated with said false flash means and said safety control means for bypassing the automatic resetting means in response to a test termination by said false flash means or said safety control means and for resetting the instrument only in response to said manually operated reset elements, a temperature control system comprising an initial heating control means responsive to said sample temperature sensing means for rapidly advancing the temperautre control system to the initial sample temperature, said initial heating control means including means for continuously heating the sample for a predetermined initial heating period while cyclically advancing the temperature control system in response to increases in the sample temperature so as to bring the sample into a controlled rate of thermal advance, heating rate control means responsive to the expected flash point setting and to the termination of said initial heating periods for heating samples having expected flash points in a predetermined high range at a prescribed fast heating rate up to a predetermined point below the expected flash point, and then automatically switching to a prescribed slow heating rate for the balance of the test, said heating rate control means being adapted to bypass said fast heating rate stage for samples having expected flash points in a predetermined low range, and means operatively associated with said heating rate control means and said initial heating control means and responsive to the expected flash point setting and to the sample temperature sensing means for terminating the initial heating stage and bypassing the fast heating rate stage in response to a sample temperature within a predetermined range below the expected flash point.

9. In an automatic flash point testing instrument including means for holding the sample to be tested in a substantially closed container having a vapor region above the sample and temperature sensing means for sensing the temperature of the sample in said container, manually operated control means for setting an expected flash point for the sample, a heater for increasing the temperature of the sample in the container to its flash point, stirring means for stirring the sample in the container at a prescribed rate, a test flame assembly including means for periodically introducing a test flame into said vapor region for the purpose of igniting the vapors therein, a flash detection means for detecting a flash due to the ignition of the vapors upon the introduction of the test flame into said vapor region, a manually operated test initiation means and automatic control means responsive to said test initiation means for actuating said stirring means, a temperature control system comprising the combination of time delay means operatively associated with said stirring means for delaying the initiation of the heating of the sample for a predetermined period after the actuation of said stirring means so as to tend to bring the sample and the instrument into thermal equilibrium, and heating rate control means responsive to the expected flash points setting for heating samples having expected flash points in a predetermined low range at a prescribed slow heating rate, and for heating samples having expected flash points in a predetermined high range at a prescribed fast rate up to a predetermined point below the expected flash point, and then automatically switching to said slow heating rate for the balance of the test.

10. In an automatic flash point testing instrument including means for holding the sample to be tested in a substantially closed container having a vapor region above the sample and temperature sensing means for sensing the temperature of the sample in said container, manually operated control means for setting an expected flash point for the sample, a heater for increasing the temperature of the sample in the container to its flash point, stirring means for stirring the sample in the container at a prescriber rate, a test flame assembly including means for periodically introducing a test flame into said vapor region for the purpose of igniting the vapors therein, a flash detection means for detecting a flash due to the ignition of the vapors upon the introduction of the test flame into said vapor region, a manually operated test initiation means and automatic control means responsive to said test initiation means for actuating said stirring means, a temperature control system comprising initial heating control means responsive to said sample temperature sensing means for rapidly advancing the temperature control system to the initial sample temperature, said initial heating control means including means for continuously heating the sample for a predetermined initial heating period while cyclically advancing the temperature control system in response to increases in the sample temperature so as to bring the sample into a controlled rate of thermal advance, and heating rate control means operatively associated with said initial heating control means for continuing the heating of the sample at a predetermined rate upon termination of said initial heating period, heating rate control means responsive to the expected flash point setting for heating samples having expected flash points in a predetermined high range at a prescribed fast rate up to a predetermined point below the expected flash point, and then automatically switching to a prescribed slow heating rate for the balance of the test, said heating rate control means beind adapted to bypass the fast heating rate stage for samples having expected flash points in a predeterminated low range, and means operatively associated with said heater for selecting a predetermined high heater power in response to expected flash point settings in said high range and a predetermined low heater power in response to expected flash point settings in said low range.

References Cited
UNITED STATES PATENTS 2,971,365 2/1961 Rhodes et al. _____ 73—36
3,011,337 12/1961 McGlynn _____ 73—36

OTHER REFERENCES

Precision scientific brochure on Automatic Cleveland Open Cup Flash Point Tester, bul. 708, received in Patent Office Apr. 22, 1963.

RICHARD C. QUEISSER, *Primary Examiner.*

C. I. McLELLAND, *Assistant Examiner.*